March 27, 1956  J. CHAMBERLAIN  2,739,444
RAMJET FUEL DISTRIBUTION DEVICE
Filed April 2, 1953
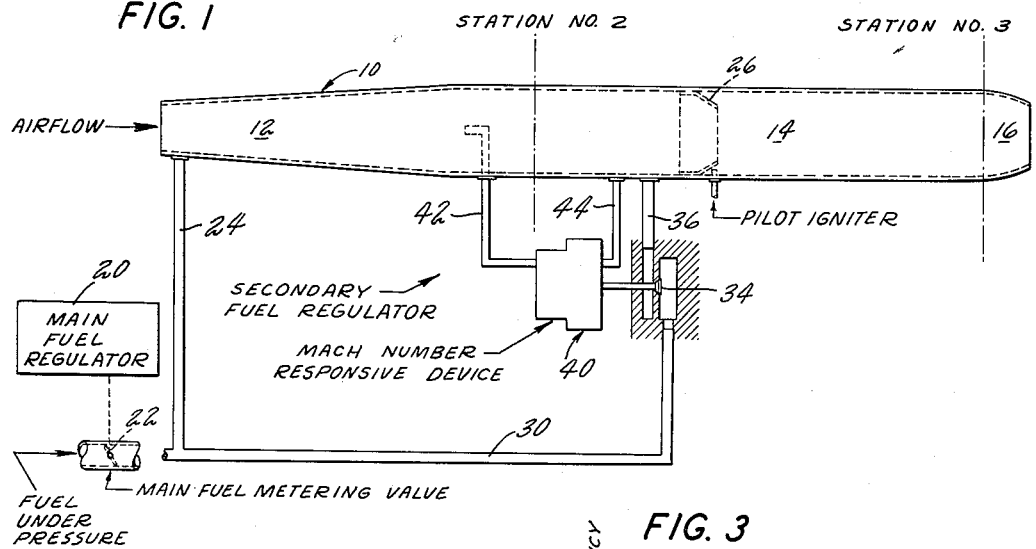
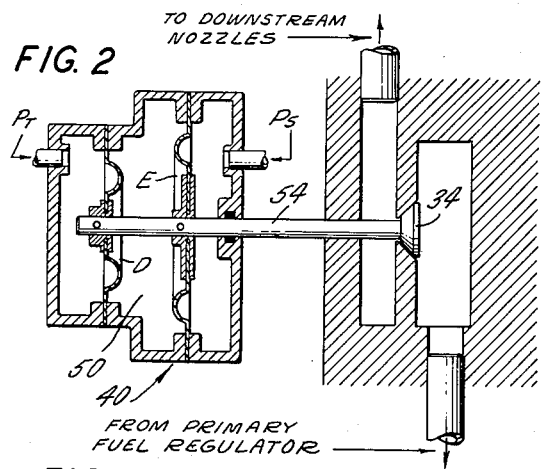
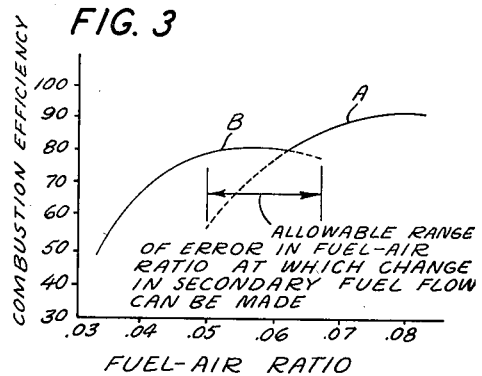
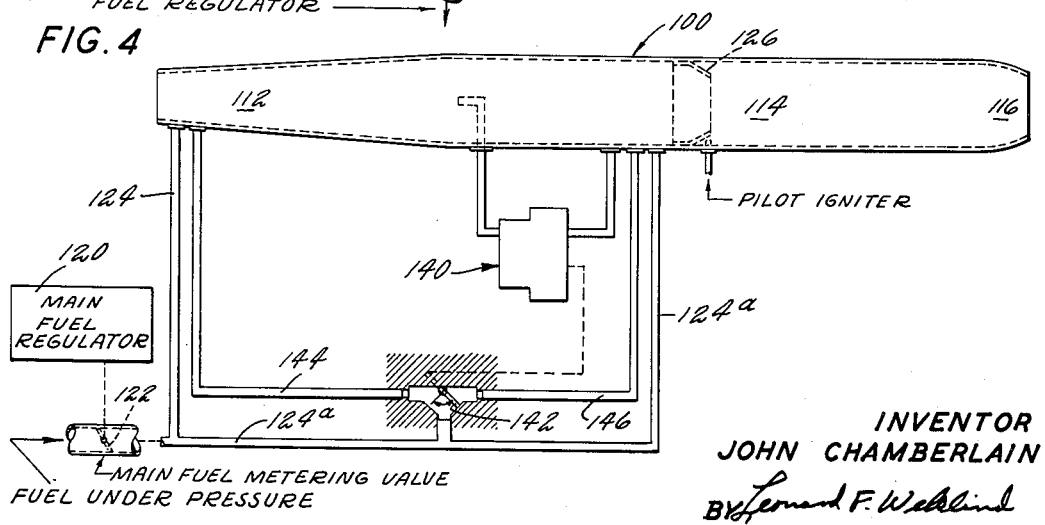
INVENTOR
JOHN CHAMBERLAIN
BY Leonard F. Wehrlund
ATTORNEY United States Patent Office 2,739,444
Patented Mar. 27, 1956

2,739,444

RAMJET FUEL DISTRIBUTION DEVICE

John Chamberlain, Manchester, Conn., assignor to United Aircraft Corporation, East Hartford, Conn., a corporation of Delaware Application April 2, 1953, Serial No. 346,367

10 Claims. (Cl. 60—39.28)

This invention relates to ramjet power plants and more specifically to fuel distribution mechanisms therefor.

It is an object of this invention to provide a fuel regulation and fuel distribution device for supersonic ramjets and the like for greatly extending the operative range of fuel-air ratios.

It is another object of this invention to provide a fuel distribution device of the type described which is simple and independent of flight Mach number, altitude, diffuser performance or exhaust nozzle conditions.

It is a further object of this invention to provide a fuel distribution device which responds solely to the inlet Mach number of the ramjet burner and comprises a pressure ratio sensing device.

These and other objects of this invention will become readily apparent from the following detailed description of the drawing in which:

Fig. 1 is a schematic illustration of a ramjet power plant having a fuel distribution device according to this invention.

Fig. 2 is a detailed cross-sectional view of the pressure ratio sensing device.

Fig. 3 is a diagrammatic illustration of the fuel-air ratio versus combustion efficiency of a typical ramjet power plant; and Fig. 4 is a diagrammatical illustration of a modified application of this invention.

Most burners of ramjet power plants are limited in operation to a certain range of fuel-air ratios. Variation in the fuel-air ratio is required to control the thrust so that acceleration, climb, cruise and deceleration or other flight conditions can be attained. A fuel control is generally provided which varies the fuel flow to increase or decrease thrust as required, except that stops are built into the control to prevent the fuel-air ratio from exceeding the rich or lean limits of the burner because above these limit a flameout occurs. A supersonic ramjet flying at an appreciable altitude under such conditions may be difficult or impossible to be reignited. It is known that the range of operable fuel-air ratios can be shifted to the lean or rich side by changing the location of the fuel injection. A shift in limits is accomplished by producing a non-uniform fuel-air profile so that the fuel-air ratio near the flameholder (where ignition occurs) is richer or leaner than the average overall fuel-air ratio.

Therefore, it is desirable to provide a fuel distribution control that is a function of fuel-air ratio only so that the fuel-air ratio near the flameholder remains relatively constant while the overall fuel-air ratio and thrust is varied. It is known that the burner inlet Mach number of a given ramjet burner depends only upon the ratio of burner outlet temperature to the burner inlet temperature if the configuration is fixed. Thus, the burner inlet Mach number is completely independent of flight Mach number, altitude, diffuser performance or exit conditions as long as the exit from the burner is choked—which is always true in supersonic ramjets. Thus the burner inlet Mach number by itself is a true indication of temperature ratio and a reasonably good indication of fuel-air ratio as described below. According to this invention no indication of air flow rate or fuel flow rate is involved.

To indicate or measure burner inlet Mach number a pressure ratio sensing device is necessary. A velocity head or pressure difference measuring device is impractical because it indicates Mach number at only one pressure level while the pressure inside a ramjet varies considerably with flight altitude, flight Mach number and ramjet operating conditions. A further explanation in this regard appears below in connection with the description of Fig. 1.

Referring to Fig. 1, a ramjet power plant is generally indicated at 10 as having a diffuser section 12, a burner section 14 and an exhaust nozzle 16. A main fuel regulator 20 is provided which controls a metering valve 22 which in turn controls the flow of fuel in the line 24 leading to a point upstream of the burner. The fuel is mixed with the air and is ignited adjacent the flamespreader 26 by means of a pilot flame or other ignition located adjacent the downstream side of the flamespreader 26. The flamespreader 26 may be of the form illustrated in Patent No. 2,592,110 issued to Berggren et al. As shown in the drawing it is apparent that the flamespreader 26 is in the form of an annular flange or shield which protrudes from the wall of the ramjet to provide a protected area therebehind. The main metering valve 22 also controls the flow of fuel to a secondary fuel line 30 which has a valve 34 located therein for regulating the flow of fuel into the secondary fuel injection line 36. The secondary fuel is injected adjacent the flamespreader 26 so as to maintain a desirable fuel-air ratio adjacent the lip thereof to insure continued flame propagation downstream of the flamespreader under varied overall fuel-air ratios. In order to control the secondary fuel flow valve 34, a Mach number sensing device generally indicated at 40 is provided. This device senses the burner inlet total pressure via the line 42 and the burner inlet static pressure via the line 44 so as to regulate valve 34 upon variation in burner inlet Mach number.

The operation of the Mach number responsive device 40 may best be described as follows. In the following description reference will be made to station numbers 2 and 3 as indicated in Fig. 1. In the following the sub numerals indicate the particular station while T refers to temperature, M is the Mach number, $P_T$ is the total pressure, $P_S$ is the static pressure, $f$ is a function. In supersonic ramjets the burner exit is choked, therefore, $M_3=1$ and all other Mach numbers in the combustion chamber are determined by conditions downstream of the flamespreader regardless of upstream conditions. The temperature ratio $T_3/T_2$ fixes $M_2$. Upstream pressure, air flow or other conditions have no effect on $M_2$ except as they affect $T_3/T_2$. Conversely, $T_3/T_2$ can be calculated from $M_2$. Fuel-air ratio is the primary variable that determines $$\frac{T_3}{T_2}$$

since $M_2=f(T_3/T_2)$ and $T_3/T_2=f$ (fuel-air ratio, $M_2=f$ (fuel-air ratio). The ratio of total pressure to static pressure at station 2 is exactly related to $M_2$ so that $P_T/P_S$ at station 2 is an indicator of fuel-air ratio regardless of flight condition.

In view of the foregoing the Mach number responsive device 40 of Fig. 1 is a pressure ratio sensing device as more clearly illustrated in Fig. 2. Thus, a diaphragm D of small area is exposed to the total pressure at the burner inlet while a larger diaphragm E is exposed to the static pressure at the burner inlet. The chamber 50 between the diaphragms D and E is evacuated. The diaphragms D and E are operatively connected to an arm 54 which in turn moves the valve 34. The force urging the valve operating rod 54 to the right is equal to $A_D \times P_T$ where $A_D$ is the area of diaphragm D and $P_T$ is the total pressure acting thereon. Also, the force urging the valve operating rod 54 to the left is equal to $A_E \times P_S$ where $A_E$ is the area of diaphragm E and $P_S$ is the static pressure acting thereon. Then the net force acting on the valve operating rod equals $A_D \times P_T - A_E \times P_S$. If the net force is zero then $A_D \times P_T = A_E \times P_S$ or $$\frac{P_T}{P_S} = \frac{A_E}{A_D}$$

Thus the arm will move toward the left if $M_2$ is below design value and to the right if $M_2$ is above design value, thus providing a signal for operating the valve or other similar device.

The operation of the fuel distribution device described above is best illustrated in Fig. 3. Curve A, illustrated herein, indicates combustion efficiency over a given overall fuel-air ratio with the extremities of the curve indicating the rich and lean limits of operation and beyond these limits combustion can be expected to cease. However, by controlling the secondary fuel flow adjacent the flamespreader of the burner the combustion efficiency will follow a path defined by the solid positions of both curves A and B. In other words, the fuel-air ratio of a power plant can be lowered considerably while still maintaining combustion in the power plant.

Referring to Fig. 4, a modified embodiment of the invention is illustrated. A ramjet power plant 100 is illustrated as having a diffuser 112, a combustion chamber 114 and an exhaust nozzle 116. A main fuel regulator 120 controls a main metering valve 122 which regulates the flow of fuel to line 124 and line 124a. Line 124a provides for a certain amount of fuel flow adjacent the flamespreader 126 in relation to the fuel flow being injected upstream via the line 124. A Mach number responsive device 140, which is identical to the device 40 mentioned in connection with Fig. 1, controls a valve 142. In the position shown the valve 142 permits a majority of fuel to flow via the line 144 rather than the line 146. The line 144 injects fuel at an upstream location while the line 146 injects fuel at a downstream location adjacent the flamespreader 126. With this device at high fuel-air ratios approximately 75% of the fuel is injected at the upstream station. On the other hand, at fuel-air ratios below approximately .050 (or some similar chosen value) the valve is moved to the opposite position shown thereby sending 50% of the fuel to the downstream nozzles. With proper adjustment the operation of the valve 142 would not affect either fuel flow or thrust so that there would be no secondary adjustments required of the main fuel metering system.

As a result of this invention it is apparent that fuel distribution can be automatically and dependably changed if the overall fuel-air ratio is varied so that a ramjet burner can be operated efficiently over an extremely wide fuel-air ratio range with little danger of encountering a rich or lean limit. Hence, as pointed out above, freedom from blowout is obtained since restarting ramjet burners under flight conditions is extremely difficult.

Although several embodiments of this invention have been illustrated and described herein, it will be apparent that various changes and modifications may be made in the construction and arrangement of the various parts without departing from the scope of this novel concept.

What it is desired to obtain by Letters Patent is:

1. In a ramjet power plant operating under choked flow conditions, a combustion chamber, a source of fuel under pressure, means for injecting fuel into the combustion chamber including a fuel regulator therefor, a flamespreader downstream of said fuel injecting means, a second means for injecting fuel into said combustion chamber and located adjacent said flamespreader, and a device responsive to the Mach number of the stream flowing through the ramjet for regulating said second means including a pressure ratio sensing device.

2. In a supersonic ramjet having a combustion chamber, means for introducing fuel into the combustion chamber including regulator means therefor, a flamespreader downstream of said fuel introducing means comprising a flange-like member protruding into the gas stream, and means for maintaining an adequately rich mixture adjacent said flamespreader at low fuel-air ratios in said combustion chamber including secondary means for introducing fuel into said combustion chamber adjacent said flamespreader, a pressure ratio sensing device operatively connected at a predetermined location internally of the ramjet, and means responsive to said pressure ratio sensing device operatively connected to said secondary means for regulating the fuel introduced thereby.

3. In a ramjet power plant having a combustion chamber, a flamespreader in said combustion chamber forming a protected area and including igniter means located in said area, a primary fuel control including means for introducing fuel into the combustion chamber upstream of said flamespreader, means for sensing the Mach number of the gas flow upstream of the flamespreader, and a secondary fuel control for introducing fuel adjacent said flamespreader, said secondary control being operatively connected to and responsive to said Mach number sensing means.

4. In a ramjet according to claim 3 wherein said Mach number sensing means includes a pressure ratio sensing device having a movable element connected to said secondary fuel control.

5. In a ramjet according to claim 4 wherein said pressure ratio device includes a movable element and two movable walls of different areas and operatively connected to said element, one of said walls being exposed to the static pressure in the ramjet and the other of said walls being exposed to the total pressure of the stream in said ramjet.

6. In a ramjet power plant having a combustion chamber, upstream and downstream injecting means for introducing fuel into the combustion chamber, a source of fuel under pressure, means for regulating the amount of flow to said injecting means including operative connections to said source, and secondary means operatively connected to said regulating means and said injecting means for simultaneously varying the relative flow to each of said injecting means, respectively.

7. In a ramjet power plant having a combustion chamber, upstream and downstream injecting means for introducing fuel into the combustion chamber, a source of fuel under pressure, means for regulating the amount of flow to said injecting means including operative connections to said source, and secondary means operatively connected to said regulating means and said injecting means for varying the relative flow to each of said injecting means respectively, said secondary means including a device responsive to the Mach number of the fluid stream flowing through a predetermined point in the power plant.

8. In a ramjet power plant having a combustion chamber, upstream and downstream injecting means for introducing fuel into the combustion chamber, a source of fuel under pressure, means for regulating the amount of flow to said injecting means including operative connections to said source, and secondary means operatively connected to said regulating means and said injecting means for varying the relative flow to each of said injecting means respectively, said secondary means including a line leading to each of said injecting means, a valve for varying the flow to each of said lines, and a pressure ratio responsive device for controlling said valve.

9. In a ramjet according to claim 8 wherein said pressure ratio responsive device senses the total and static pressures at the inlet to the combustion chamber.

10. In a power plant having a stream of air flowing therethrough, a combustion chamber, a source of fuel under pressure, a first and second means for injecting fuel into the air flowing into said combustion chamber, said first and second means being spaced along the axis of airflow, said first means being located upstream of said second means and said second means being located in the vicinity of said combustion chamber, a primary fuel regulator for controlling the flow of fuel to one of said first and second means, and a secondary fuel regulator for varying the flow of fuel to the other of said first and second means including a pressure ratio device responsive to pressures at a predetermined location in the power plant.

References Cited in the file of this patent

UNITED STATES PATENTS

| | | |
|---|---|---|
| 2,512,790 | Cleveland | June 27, 1950 |
| 2,540,594 | Price | Feb. 6, 1951 |
| 2,550,678 | Deacon | May 1, 1951 |
| 2,632,298 | Willgoos | Mar. 24, 1953 |
| 2,640,316 | Neal | June 2, 1953 |

FOREIGN PATENTS

| | | |
|---|---|---|
| 615,451 | Great Britain | Jan. 6, 1949 |